(12) United States Patent
Rameshni (10) Patent No.: US 7,722,852 B2
(45) Date of Patent: May 25, 2010

(54) PROCESS FOR THE THERMAL REDUCTION OF SULFUR DIOXIDE TO SULFUR

(75) Inventor: Mahin Rameshni, Monrovia, CA (US)

(73) Assignee: WorleyParsons Group, Inc., Arcadia, CA (US)

(*) Notice: Subject to any disclaimer, the term of this patent is extended or adjusted under 35 U.S.C. 154(b) by 0 days.

(21) Appl. No.: 12/167,676

(22) Filed: Jul. 3, 2008

(65) Prior Publication Data

US 2009/0010834 A1    Jan. 8, 2009

Related U.S. Application Data

(60) Provisional application No. 60/948,014, filed on Jul. 5, 2007.

(51) Int. Cl.
    *C01B 17/04* (2006.01)
(52) U.S. Cl. ............. 423/576; 423/576.2; 423/573.1
(58) Field of Classification Search ........... 423/576, 423/576.2, 573.1
    See application file for complete search history.

(56) References Cited

U.S. PATENT DOCUMENTS

| 3,978,200 | A |   | 8/1976  | Bajars         |          |
|-----------|---|---|---------|----------------|----------|
| 4,039,650 | A |   | 8/1977  | Daley          |          |
| 4,117,100 | A | * | 9/1978  | Hellmer et al. | 423/569  |
| 4,328,201 | A |   | 5/1982  | Steiner et al. |          |
| 4,396,594 | A |   | 8/1983  | Kohl           |          |
| 4,404,180 | A |   | 9/1983  | Drum et al.    |          |
| 5,066,474 | A |   | 11/1991 | Laird          |          |
| 5,248,413 | A | * | 9/1993  | Stencel et al. | 208/400  |
| 5,269,929 | A |   | 12/1993 | Sublette et al.|          |
| 5,624,649 | A |   | 4/1997  | Gal            |          |
| 6,056,936 | A |   | 5/2000  | Nougayrede et al. |       |
| 6,297,189 | B1|   | 10/2001 | Jin et al.     |          |
| 7,074,375 | B2| * | 7/2006  | Lampert et al. | 423/244.09 |
| 2002/0119091 | A1 | * | 8/2002 | Keller        | 423/576.8 |
| 2006/0288919 | A1 |   | 12/2006 | Rameshni     |          |

OTHER PUBLICATIONS

International Search Report for International Patent Application No. PCT/US2008/069272 dated Aug. 12, 2009.
Written Opinion for International Patent Application No. PCT/US2008/069272 dated Aug. 12, 2009.

* cited by examiner

*Primary Examiner*—Timothy C Vanoy
*Assistant Examiner*—Michelle Hou
(74) *Attorney, Agent, or Firm*—Locke Lord Bissell & Liddell LLP (57) ABSTRACT

Processes for the thermal reduction of sulfur dioxide to elemental sulfur are described and disclosed. The processes described include three general reaction sections, including the reaction furnace portion where the $SO_2$-containing stream is combusted, the hydrogenation portion wherein the effluent from the reaction furnace is hydrogenated over an appropriate catalyst, and a Claus conversion portion, wherein residual $H_2S$ and $SO_2$ are further reacted to produce additional elemental sulfur.

19 Claims, 4 Drawing Sheets

PROCESS FOR THE THERMAL REDUCTION OF SULFUR DIOXIDE TO SULFUR

CROSS REFERENCE TO RELATED APPLICATIONS

The present application claims priority to U.S. Provisional Patent Application Ser. No. 60/948,014 filed Jul. 5, 2007, the contents of all of which are incorporated herein by reference.

STATEMENT REGARDING FEDERALLY SPONSORED RESEARCH OR DEVELOPMENT

Not Applicable

REFERENCE TO SEQUENCE LISTING

Not Applicable

REFERENCE TO A TABLE

Not Applicable

REFERENCE TO A COMPUTER PROGRAM LISTING COMPACT DISK APPENDIX

Not Applicable

BACKGROUND OF THE INVENTION

1. Field of the Invention

This disclosure relates generally to processes for the production of elemental sulfur from sulfur dioxide, and more particularly to processes for the thermal reduction of sulfur dioxide, such as that from effluent streams, to elemental sulfur.

2. Description of the Related Art

Appreciable amounts of sulfur dioxide are found in many industrial gases vented into the atmosphere from plants involved in roasting, smelting and sintering sulfide ores, or gases from power plants burning high sulfur coal or fuel oils or other sulfurous ores or other industrial operations involved in the combustion of sulfur-bearing fuels, such as fuel oil. Air pollution as the result of sulfur dioxide emission in these gases presents not only health hazards, but also results in the loss of valuable sulfur values. One of the more difficult environmental problems facing industry is how to economically control $SO_2$ emissions from these sources. One of the approaches is the recovery of sulfur dioxide from such gases and related waste streams, preferably in the form of elemental sulfur which may be reused to an economic advantage, especially as it may be stored and transported less expensively than other reduction products.

The reduction of sulfur dioxide, including its reduction to elemental sulfur, has been investigated extensively over the years. In fact, a number of processes are known for the reduction of sulfur-dioxide containing gases and gas streams to elemental sulfur. One proposed process, suggested in German patent application No. 2,365,116, describes a process for reducing sulfur dioxide-containing gases with relatively pure hydrogen at temperatures greater than 600° C. (1112° F.) without the use of a reduction catalyst. Due to this process requiring relatively pure hydrogen gas, this process is relatively expensive, and may not be appropriate for large-scale reduction processes.

Other approaches described in the art have utilized interesting methodologies, but methodologies which nonetheless are often not applicable to large-scale process situations, are cost inefficient, result in the formation of other, non-desirable products, or do not have high recovery and/or product quality values. For example, one reported process for the conversion of elemental sulfur to sulfur dioxide involves the reduction with a carbonaceous material such as coke, wood, or petroleum coke in a reaction zone containing a molten salt, such as sodium or potassium sulfide. Another approach to solving the problem at hand includes the reduction of sulfur dioxide (from an off-gas) to elemental sulfur via a process of converting the sulfur dioxide to sulfur by passing a sulfur dioxide-containing off-gas through a reactor containing a mixture of fresh and recycled coal. Finally, biological processes, such as those reported in U.S. Pat. No. 5,269,929, have been suggested, proposing the microbial reduction of sulfur dioxide to hydrogen sulfide using sulfate reducing bacteria in co-culture with anaerobic heterotrophs, such as the sulfate reducing bacteria belonging to the genera *Desulfovibrio* and the like, under anaerobic conditions. Reportedly, the $SO_2$ converted by the microorganisms to $H_2S$ may then be reacted with some remaining $SO_2$ in a Claus reactor in order to produced elemental sulfur, as desired. However, the applicability of this process to industrial-scale processes has not yet been shown.

From the above brief overview, it can be appreciated that numerous of the prior art desulfurization and/or sulfur dioxide-reducing processes have the distinct disadvantage of producing, at best, a byproduct having only nominal market value, and therefore having only a minor effect on the economic aspects of the sulfur dioxide reduction process. Accordingly, it would be desirable to have a sulfur dioxide reduction process which produces elemental sulfur as the major product, wherein such a process is economically and environmentally efficient.

This application for patent discloses processes for the thermal reduction of sulfur dioxide ($SO_2$) to elemental sulfur in high recovery.

BRIEF SUMMARY OF THE INVENTION

The present invention relates to processes for recovering sulfur from sulfur dioxide ($SO_2$) containing waste streams using thermal reduction methods. Key advantages of the processes described herein include lower fuel consumption and favorable operability parameters (e.g., reasonable capital and operating costs), reduced emissions, better sulfur product quality (post-recovery), an increased estimated sulfur recovery, including an estimated sulfur recovery of at least about 90%, and better operational stability. Depending upon the quantity of $SO_2$, the concentration of the $SO_2$, the presence of impurities and/or the oxygen content of the $SO_2$-containing waste stream, the stream may or may not be concentrated by one or more known concentration processes prior to introduction into the process of the present disclosure.

In accordance with aspects of the present invention, it is an object of the present disclosure to provide a process for producing elemental sulfur from sulfur dioxide-containing gases and waste streams containing sulfur dioxide in high overall recovery yields, and with a minimum number of process steps. A further object of the present disclosure it to provide such a process which results in a minimum number of formed byproducts, which would otherwise require further treatment and/or disposal.

A further object of the present disclosure is the provision of an efficient process for converting sulfur dioxide to elemental sulfur in amounts required in, and economically acceptable for, present day industrial operations. Another object is to provide such a process which can tolerate variances in operating conditions within a given range without major equipment adaptations. A further object is to provide a process which can be utilized in co-acting phases to provide, at acceptable economics, the capacity required in present-day industrial operations.

In another embodiment of the present disclosure, a process for the thermal reduction of sulfur dioxide ($SO_2$) to elemental sulfur is described, wherein the process comprises at least three main regions, a reaction furnace region, a hydrogenation region, and a Claus conversion region. The first region, the reaction furnace region, comprises an admixture of gaseous hydrocarbon(s), an oxygen-containing gas (such as air, oxygen-enriched air, or substantially pure oxygen), and a waste stream comprising $SO_2$ that are combusted in a reaction furnace to generate hydrogen gas ($H_2$) and carbon monoxide (CO), resulting in a first hydrogenation of $SO_2$ to $H_2S$ with the subsequent thermal conversion of $H_2S$ and residual $SO_2$ to sulfur, in a Claus-type reaction process.

In the hydrogenation region of the thermal conversion process, in accordance with embodiments described herein, the effluent flowing from the reaction furnace is directed to a catalytic reactor system comprising a hydrogenation catalyst. In accordance with aspects of this embodiment, the hydrogenation catalyst may be any appropriate hydrogenation catalyst, preferably a cobalt-molybdenum catalyst. The hydrogenation catalyst(s) within the catalytic reactor systems can promote the Claus reaction of the components of the effluent stream, and may also do one or more of the following: (1) convert CO to $CO_2$ and $H_2$, (2) consume residual $H_2$ to further reduce $SO_2$ to $H_2S$, and/or (3) hydrolyze $CO_2$ and $CS_2$ to $H_2S$ and $CO_2$. In further accordance with the present disclosure, the processes described herein may comprise one or more hydrogenation reactors, internally-cooled hydrogen reactors, inter-stage or multiple-stage hydrogenation reactors, and the like.

The third region of the thermal conversion process, in accordance with aspects of the embodiments described herein, comprises one or more Claus conversion regions. In these regions, the residual $H_2S$ and $SO_2$ may be further reacted in order to produce elemental sulfur, the process comprises one or more additional catalytic reaction stages. These additional catalytic reaction stages may optionally employ one or more catalysts, such as those typically employed in a Claus process. In further accordance with this aspect of the present disclosure, residual effluent streams comprising $H_2S$ and/or $SO_2$ may be further contacted with one or more additional catalytic reaction stages in order to produce additional elemental sulfur, as appropriate.

In accordance with further embodiments of the present invention, processes for the thermal reduction of sulfur dioxide from ($SO_2$)-containing effluent streams to elemental sulfur are described, wherein the processes comprise contacting a hydrocarbon with an oxygen-comprising gas and a sulfur dioxide-containing effluent stream at elevated temperatures prior to their introduction into a reaction furnace for a period of time sufficient to produce both hydrogen and carbon monoxide, the formation of which may contribute to the hydrogenation of $SO_2$ in the $SO_2$-containing effluent stream to hydrogen sulfide ($H_2S$), with the subsequent thermal conversion of $H_2S$ and residual $SO_2$ to sulfur according to a Claus reaction within the reaction furnace.

In further accordance with this aspect of the present disclosure, the activated catalyst in the first reaction zone is a hydrogenation catalyst, such as a cobalt-molybdenum catalyst, which promotes a Claus reaction in the reactor, consumes residual hydrogen, and produces additional hydrogen sulfide and carbon dioxide by hydrolysis. In still further accordance with the present disclosure, residual effluent streams comprising $H_2S$ and/or $SO_2$ may be further contacted with one or more additional catalytic process stages in order to produce additional elemental sulfur. Such additional catalytic process stages may employ alumina and/or titania catalysts or their equivalents.

BRIEF DESCRIPTION OF THE DRAWINGS

The following figures are part of the present disclosure and are included to further illustrate certain aspects of the present invention. Aspects of the invention may be understood by reference to one or more figures in combination with the detailed written description of specific embodiments presented herein.

While the inventions disclosed herein are susceptible to various modifications and alternative forms, only a few specific embodiments have been shown by way of example in the drawings and are described in detail below. The figures and detailed descriptions of these specific embodiments are not intended to limit the breadth or the scope of the inventive concepts or the appended claims in any manner. Rather, the figures and detailed written descriptions are provided to illustrate the inventive concepts to a person of ordinary skill in the art and enable such person to make and use the inventive concepts.

DETAILED DESCRIPTION OF THE INVENTION

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill the art having benefit of this disclosure.

In general terms, Applicant has created new processes for the thermal reduction of sulfur dioxide ($SO_2$) to elemental sulfur having high purity and in both reasonable economic costs and amount of sulfur recovered.

In the discussion of the Figures, the same or similar numbers will be used throughout to refer to the same or similar components. Not all valves and the like necessary for the performance of the process have been shown in the interest of conciseness. Additionally, it will be recognized that alternative methods of temperature control, heating and cooling of the process streams are known to those of skill in the art, and may be employed in the processes of the present invention, without deviating from the disclosed inventions.

Figure 1:
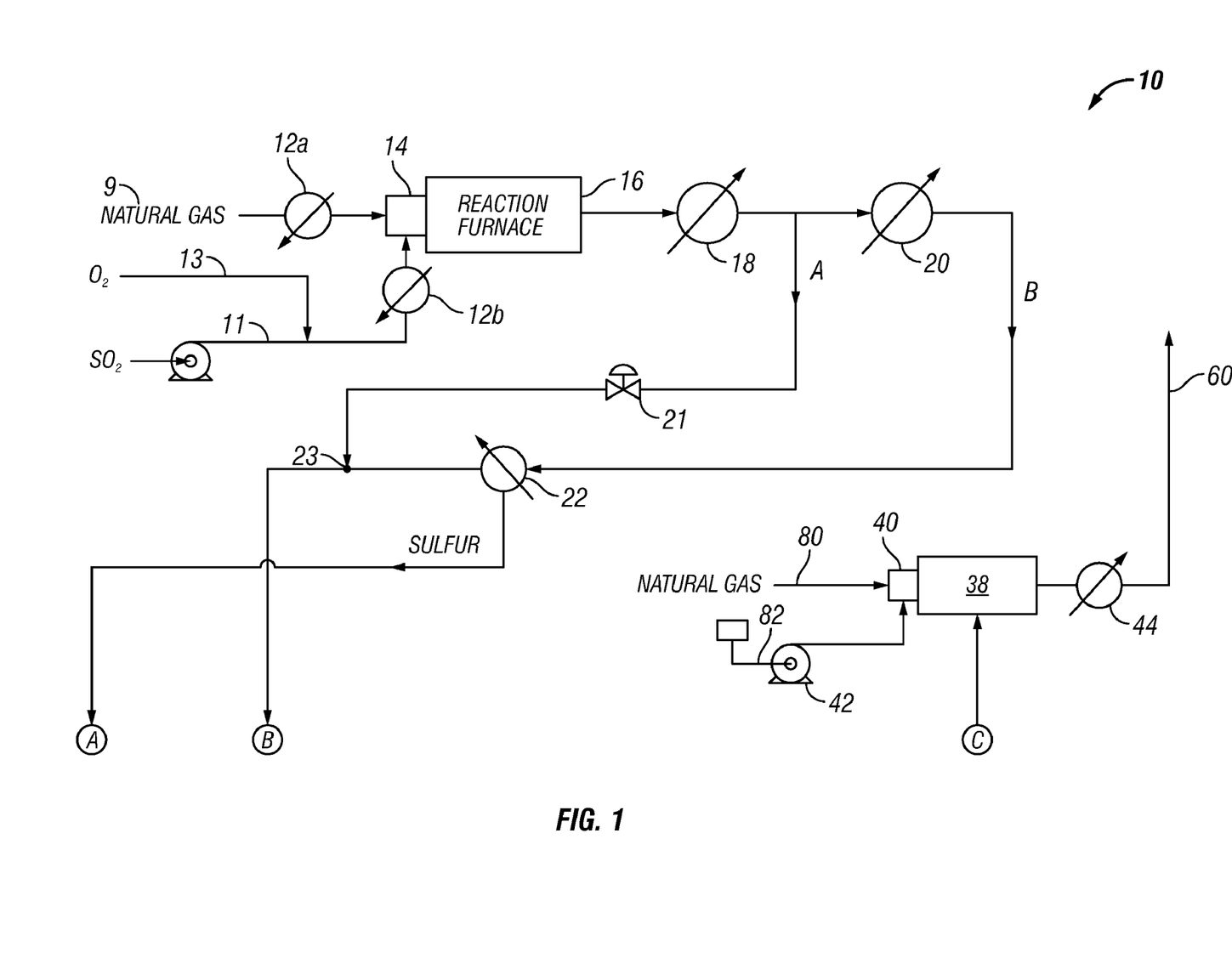
FIG. 1 illustrates a schematic diagram of an embodiment of the present disclosure.

Turning now to the figures, in FIG. 1, a waste stream comprising $SO_2$ (11) is combined with a gas stream (13) comprising oxygen, such as air, oxygen-enriched air, or substantially pure oxygen, and the resultant effluent stream is passed through an off-gas preheater (12b) and into reaction furnace burner (14). Concurrently, a gaseous hydrocarbon, (9), such as natural gas or the like, is first heated in natural gas preheater (12a) and is then conveyed into reaction furnace burner (14). As illustrated in the figure, the gaseous mixtures may be separately preheated to a temperature ranging from about 500° C. (about 932° F.) up to about 650° C. (1200° F.). In accordance with the present disclosure, it is not required to heat any of the gaseous streams entering the reaction furnace burner (14). However, in order to reduce the fuel consumption of the hydrocarbon stream, and in order to reduce the cost of fuel as well as increase the economic desirability of the presently disclosed processes, it is preferred to use preheaters such as preheaters (12a) and (12b) to raise the temperature of the respective gas streams from about 500° C. (about 932° F.) up to about 650° C. (1200° F.) prior to their entrance into reaction furnace burner (14). With continued reference to FIG. 1, the heated gaseous hydrocarbon stream (9), $SO_2$-containing waste stream (11), and heated oxygen-enriched air stream (13) are combined and admixed in reaction furnace burner portion (14) of the furnace, and are then conveyed into reaction furnace (16).

The sulfur dioxide ($SO_2$) stream (11) is preferably a waste stream effluent comprising a molar concentration of $SO_2$ ranging from about 1% to about 100%, which can come from any number of suitable $SO_2$ sources, including but not limited to the numerous gases emanating from plants involving roasting, smelting, and sintering of sulfide-containing ores; gases from power plants burning high sulfur coal, fuel oils, or other sulfurous ores; industrial operations involved in the combustion of sulfur-bearing fuels, such as fuel oil; tail gas streams from any number of process plants, the condensation of enriched stripper gases, tail gas effluent, and the like; from the combustion of fossil fuels; from the burning of crude oils; from the smelting of sulfide ores such as iron pyrites and sphalerite (zinc blende); and heating calcium sulfate (gypsum) with coke and sand in the manufacture of cement. In accordance with an aspect of the present invention, the $SO_2$ stream is preferably pretreated to remove particulate material and concentrate the stream to a molar concentration ranging from about 25% to about 100% before entering the unit, although removal of particulates and concentration is not necessary for operation of the presently described process.

In accordance with the present disclosure, gaseous hydrocarbon (9) may comprise a hydrocarbon such as methane ($CH_4$) or hydrocarbon mixture, methanol, a hydrogen and carbon monoxide mixture, or mixtures thereof. Hydrocarbons suitable for use as, or as a part of, a natural gas stream (9) include hydrocarbons which are selected from the group consisting of alkanes, alkenes, alkynes, cycloalkanes, aromatic hydrocarbons, and mixtures thereof. In reference to natural gas (9), and as used herein, the term hydrocarbon is meant to refer to those organic compounds (both saturated and unsaturated) composed solely of the elements hydrogen and carbon. Suitable hydrocarbon reducing agents for use herein include but are not limited to alkanes of the general formula $C_nH_{2n+2}$ (wherein 'n' is an integer greater than or equal to 1), such as methane, ethane, propane, n-octane, and the like, as well as mixtures of alkanes; alkenes of the general formula $C_nH_{2n}$ (wherein 'n' is an integer greater than or equal to 1), including 1-butene and 1-propene, and mixtures of alkenes; alkynes of the general formula $C_nH_{2n-2}$ (wherein 'n' is an integer greater than or equal to 1), and mixtures of alkynes; cycloalkanes of the general formula $C_nH_{2n}$ (wherein 'n' is an integer greater than or equal to 1), including cyclohexane and other "naphthenes", as well as mixtures thereof; aromatic compounds of the general formula $C_nH_{2n-6}$, including both monocyclic (benzene) and polycyclic (napthene) aromatics; as well as mixtures of the above described hydrocarbons. Suitable natural gases and natural gas mixtures can also be formed by the combustion of a hydrocarbon in the presence of an amount of oxygen insufficient for the complete oxidation of the hydrocarbon.

With continued reference to FIG. 1, the reaction furnace (16) may be any suitable heater, externally-fired heater, furnace, reactor or generator, such as those externally fired systems commonly used in ethylene cracking operations or $CS_2$ production. The amounts of natural gas, oxygen, and $SO_2$-comprising effluent streams fed to the unit may be controlled so as to maintain the mole ratio of $H_2S$ to $SO_2$ in the tail gas stream (60) of the overall process. It is presently preferred that the $H_2S$ to $SO_2$ mole ratio be controlled so as to be in a range from about 2:1 to about 10:1, and more preferably from about 2:1 to about 5:1, although ratios outside of these ratios may be appropriate, depending upon the overall setup of the production process.

The reaction between the $SO_2$-containing effluent stream, oxygen-containing gas, and heated hydrocarbon stream continues within the reaction furnace (16), wherein the hydrocarbon is partially oxidized to generate hydrogen gas ($H_2$) and CO, resulting in the hydrogenation of $SO_2$ to $H_2S$ with subsequent thermal conversion of $H_2S$ and residual $SO_2$ to sulfur, according to the Claus reaction. The thermal reduction conducted within reaction furnace (16) occurs at temperatures ranging from about 800° C. (about 1472° F.) to about 1400° C. (about 2552° F.), and more preferably from about 900° C. (about 1652° F.) to about 1300° C. (about 2372° F.), as well as ranges in between these ranges, such as from about 950° C. (about 1742° F.) to about 1250° C. (about 2282° F.). After exiting the reaction furnace (16), the effluent stream passes through a first waste heat boiler (18) in order to recover a portion of the heat that is generated, the recovery being accomplished by producing medium or high pressure (HP) steam. The gas mixtures may then be furthered cooled (e.g., to about 200° C. to about 500° C.) in a second pass through the waste heat boiler (WHB). A slip stream of the gas, path A, may be used as a preheater in order to heat the gas effluent stream from the reactor furnace (16) prior to entering No. 1 converter (24). The remaining gas effluent mixture stream, following flow path B, is cooled in the second pass of the waste heater boiler (20). A reheater may optionally be used instead of the hot gas bypass route (path A), such a reheater being typically located downstream of the first condenser (22). The gas effluent mixture stream, path B, will be furthered cooled, i.e., to a temperature ranging between about 110° C. (about 230°F.) to about 150° C. (about 302° F.), or from about 115° C. (about 239° F.) to about 130° C. (about 266° F.)), as it passes through the first condenser (22) to condense any sulfur that has formed, wherein the elemental sulfur that has formed may be removed and conveyed to an appropriate repository, such as sulfur pit (52). The gas effluent stream that leaves the No. 1 condenser (22) is then mixed with the path A hot gas bypass stream at some point (23) before being fed at an appropriate rate (e.g., about 1000Nm³/hr, without limitation) into the No. 1 Converter (24), a hydrogenation reactor.

With continued reference to FIG. 1, converter No. 1 (24) wherein the hydrogenation step of this disclosure occurs, typically comprises one or more reactors containing hydrogenation catalysts or catalyst systems suitable for promoting the reduction of $SO_2$ to $H_2S$, and may include any of the appropriate catalyst systems as described herein, without limitation. The hydrogenation step may take place at a temperature ranging from about 200° C. (about 392 F.) to about 1300° C. (about 2372° F.), as well as ranges within this range, such as from about 250° C. (about 482° F.) to about 600° C. (about 1112° F.), or from about 900° C. (about 1652° F.) to about 1250° C. (about 2282° F.), without limitation, and depending upon, among other things, the particular hydrogenation catalyst employed.

Converter No. 1 (24) comprises at least one hydrogenation catalyst, which may be any appropriate hydrogenation catalyst or catalyst system suitable for the particular use, such as those employed in units that treat tail gas from Claus sulfur recovery units. Such catalysts promote the Claus reaction within the reactor, and serve the additional purposes of at least 1) shifting the CO equilibrium toward $CO_2$ and $H_2$ production, 2) consuming residual hydrogen so as to further reduce $SO_2$ to $H_2S$, and 3) hydrolyze any COS and $CS_2$ present to $H_2S$ and $CO_2$. A non-limiting, exemplary catalyst system suitable for use herein is a Co/Mo (cobalt-molybdenum) hydrogenation catalyst, which may be supported on any appropriate support know in the art, including alumina ($Al_2O_3$), activated alumina, aluminosilicates, and zeolites, available commercially or prepared in any suitable manner known to those of skill in the art (including, for example, co-precipitation, impregnation methods, amorphous- or melt-alloy techniques, quenching-molding methods, and the like).

The effluent gas (50) exiting from catalytic reactor (24) is cooled to an appropriate temperature, e.g., to a temperature ranging from about 115° C. (about 239° F.) to about 130° C. (about 266° F.), in the No. 2 condenser (26) to produce condensed elemental sulfur, which is then conveyed to sulfur pit (52) as described above in reference to the No. 1 condenser (22). A slip stream as a hot gas bypass is used to reheat the gas prior entering the No. 2 converter (28) instead of gas preheater as described above in reference to the No. 1 converter (24). If a preheater is used, it will preferably be located between the No. 2 condenser (26) and the No. 2 converter (28). Hot gas bypasses may be used in association with the economical reasons and advantages of this disclosure.

The gas effluent from condenser (26) is then mixed with the hot gas bypass at point (27) and then conveyed to the No. 2 converter (28). Converter (28) acts as a catalytic reactor in a Claus conversion step of this present process disclosure, employing one or more Claus catalysts including alumina catalysts, activated alumina catalysts (such as S-100 SR catalysts), silica-alumina catalysts, alumina/titania catalysts, and/or titania catalysts, or any other catalyst systems which are employed in the Claus process, the catalysts having a range of surface area, pore volume, shapes (e.g., star shaped, beads, or powders), and percent catalyst content (in non-limiting example, from about 50 wt. % to about 95 wt. % $Al_2O_3$, having a purity up to about 99+%), without any limitations. The Claus processes within converter (28) (and subsequent converters, such as converter 32) may be carried out at conventional reaction temperatures, ranging from about 200° C. (about 392° F.) to about 1300° C. (about 2372° F.), and more preferably from about 240° C. (about 464° F.) to about 600° C. (about 1112° F.), as well as over temperature ranges between these ranges, including from about 210° C. (about 410° F.) to about 480° C. (about 896° F.), and from about 950° C. (about 1742° F.) to about 1250° C. (about 2282° F.), without limitation. The number of Claus conversion steps employed, which may range from one stage to more than ten, depends on the particular application and the amount of sulfur recovery required or desired. In accordance with certain non-limiting aspects of the present disclosure, the number and placement of multiple converters/reactors, and the associated condenser systems, may be adjusted without affecting the overall thermal reduction process described herein. The No. 3 converter (32) is the second stage of the Claus conversion for the aspect of the disclosure illustrated in FIG. 1.

As further illustrated in FIG. 1, a portion (50*a*) of the process effluent gas stream (50) may be recycled, as an advantages to the process via a low-head centrifugal recycle blower (23) or eductor, internal cooling hydrogenation reactor(s) or inter-stage cooling reactor(s) or the like, back through catalytic reactor (24), as appropriate, such as when processing a concentrated or not concentrated $SO_2$-containing stream to control the temperature in the hydrogenation step in the No. 1 converter (24) or increase the life of the catalyst. Eliminating such devices do not adversely impact on the presently disclosed processes.

The effluent gas from the No. 2 Converter (28) flows to the No. 3 condenser (30) to produce condensed elemental sulfur, which is then conveyed to sulfur pit (52) as described above in reference to the No. 2 condenser (26). A slip stream as a hot gas bypass (not shown) may be used to reheat the gas prior entering the No. 3 converter (32) instead of, or in combination with, a gas preheater as described above in reference to the No. 2 converter (28). If a preheater is used, it will typically be located between the No. 3 condenser (30) and the No. 3 converter (32). As suggested previously, a hot gas bypass may used for an economical reason of this disclosed process. The effluent from the No. 3 converter (32) then flows to the No. 4 condenser (34) to produce condensed elemental sulfur, which is then conveyed to sulfur pit (52) as described above in reference to the No. 3 condenser (30).

As illustrated in FIG. 1, a portion (50*a*) of the process effluent gas stream (50) may be recycled, as an advantage to the process via a low-head centrifugal recycle blower (23) or eductor, internal cooling hydrogenation reactor(s) or inter-stage cooling reactor(s) or the like, back through catalytic reactor (24), as appropriate, such as when processing a concentrated or not concentrated $SO_2$-containing stream to control the temperature in the hydrogenation step in the No. 1 converter (24) or increase the life of the catalyst. Eliminating such a device has no impact on the presently-disclosed processes.

The effluent gas from the No. 2 Converter (28) flows to the No. 3 condenser (30), where the temperature of the effluent gas may be lowered e.g., to a temperature from about 115° C. (about 239° F.) to about 130° C. (about 266° F.), in order to produce condensed elemental sulfur, which may then be conveyed to sulfur pit (52) as described above in reference to the No. 2 condenser (26). A slip stream as a hot gas bypass is used to reheat the gas prior entering the No. 3 converter (28) instead of gas preheater as described above in reference to the No. 2 converter (28). If a preheater is used, it will be located between the No. 3 condenser (30) and the No. 3 converter (32). A hot gas bypass may be used for economic reasons of this invention. The effluent from the No. 3 converter (32) flows to the No. 4 condenser (34) to produce condensed elemental sulfur, which is then conveyed to sulfur pit (52) as described above in reference to the No. 3 condenser (30).

As is also illustrated in FIG. 1, a portion (50*a*) of process effluent gas may also, optionally, be directed via an appropriately-located bypass (29) or the like, such as a steam jet syphon, condenser, valve, ejector, or jet ejector, directly to a final converter/reactor comprising a catalytic stage, such as No. 3 converter (32), in order to react any residual $H_2S$ and $SO_2$ and produce additional elemental sulfur. This pathway is appropriate in instances, for example, where the processing of a low-concentrated $SO_2$-stream is involved.

As described above, FIG. 1 illustrates a multi-stage thermal reduction system in which the effluent gas stream (50) from the No. 1 converter/catalytic reactor (24) is conveyed to additional Claus-type converters/reactors, such as those shown in the figure as the No. 2 converter (28) and the No. 3 converter (32). In accordance with aspects of the present disclosure, the number and placement of multiple converters/reactors, and associated condenser systems, may be adjusted without affecting the overall thermal reduction process described herein.

As also indicated in FIG. 1, and in accordance with aspects of the present disclosure, the process gas stream (50) may be directed through one or more of the additional reaction stages after passing through a first reactor comprising a hydrogenation catalyst, in order to increase sulfur recovery and improve overall process efficiency. For example, FIG. 1 illustrates a (non-limiting) second and third reaction stage, comprising the No. 2 converter (28), No. 3 sulfur condenser (30), No. 3 converter (32), and No. 4 sulfur condenser (34) for further reaction of residual $H_2S$ and $SO_2$ to produce elemental sulfur through the respective process streams (54) and (56).

In contrast with the first hydrogenation reaction stage (24), the second and third reaction stages (28) and (32), also referred to equivalently herein as the "Claus conversion" stages or zones, comprise at least one catalytic stage, comprising at least one alumina and/or titania catalyst, which may be associated with any appropriate substrate, and sized appropriately, as described above. As the process streams (50) and (54) pass through converters/reaction stages (28) and (32), respectively, residual hydrogen sulfide and sulfur dioxide contained within the streams may be further reacted as they contact the at least one catalytic stage. Upon exiting the respective converters, the effluent streams pass through associated condensers (30) and (34), generating effluent streams (54) and tail gas stream (36), respectively, and a liquid sulfur stream (70) which is conveyed to the sulfur pit (52). The process is typically able to achieve an overall sulfur recovery efficiency of greater than about 80%, and preferably greater than about 90%, based on the theoretical amount of recoverable sulfur. For example, the sulfur recovery efficiency may be about 95% (or more) with an initially-concentrated $SO_2$-containing waste stream (11) and three catalytic reaction stages (24, 28, 32) as illustrated.

With continued reference to FIG. 1, the tail gas stream (36), upon exiting the last reaction stage, may optionally be conveyed to a natural or forced-draft incinerator (38), where it is contacted with a natural gas stream (80) and an air stream (82) [via air blower (42)], both of which have been contacted, heated and previously mixed in incinerator/burner (40). Upon contact and mixing with the natural gas and air in incinerator (38), the incinerated tail gas stream (36) may pass through a further waste heat boiler (44) in order to recover residual heat energy, after which the incinerated stream (60) is discharged to the atmosphere via an existing or new stack system or the equivalent.

As described herein, the liquid sulfur recovered by the disclosed processes is typically collected in a sulfur pit (52) or other appropriate collection device or approved location, and may removed as appropriate, such as by a sulfur pump or pump system (73) to be handled by others, or shipped as appropriate.

Figure 2:
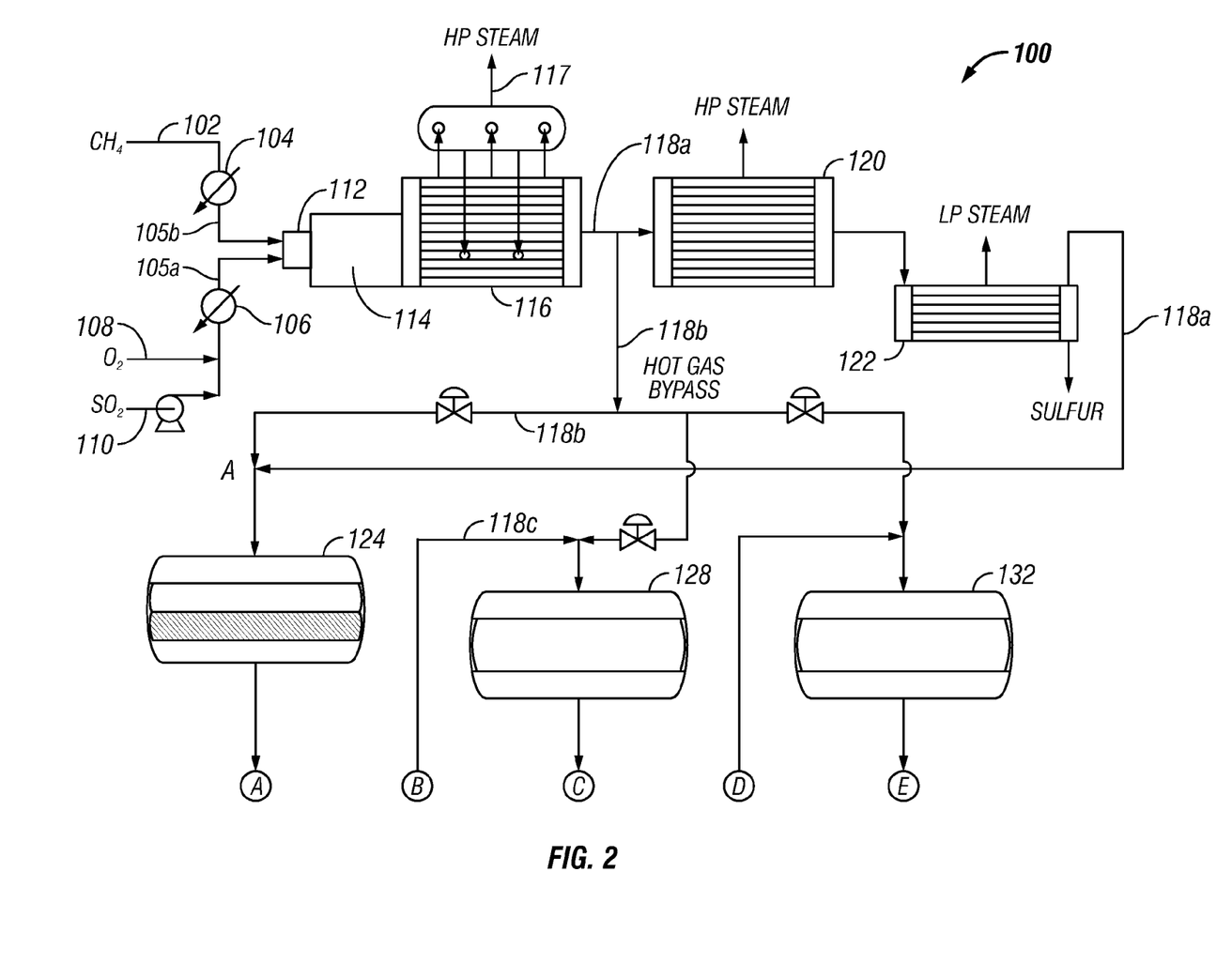
FIG. 2 illustrates a schematic diagram of an alternate embodiment of the present disclosure.

In FIG. 2, an alternate embodiment of the present invention is illustrated. In this embodiment, the overall thermal reduction process 100 comprises, generally, the conversion of an $SO_2$-containing waste stream to hydrogen sulfide ($H_2S$), with the subsequent conversion of $H_2S$ and residual sulfur dioxide to elemental sulfur (e.g., $S_8$) in a furnace or similar assembly by way of the Claus reaction as described in reference to FIG. 1. This first reaction/conversion step is followed by passing the furnace effluent through a catalytic hydrogenation reactor to generate $H_2S$ by a reductive process, followed by the reaction of the residual $H_2S$ and $SO_2$ in additional catalytic reaction stages employing alumina and/or titania catalysts to produce additional elemental sulfur.

The thermal reduction process 100 illustrated in FIG. 2 represents schematically, in addition to the overall process scheme, the plurality of different locations for devices for removing hot bypass gases for the hydrogenation and Claus reaction steps. As indicated therein, and as will be understood, the process illustrated generally in FIG. 2 may be performed with and without recycling the gas through the hydrogenation step of the process. Further, in accordance with the embodiments of the present disclosure, reheaters may be used instead of hot gas bypass valves.

Additionally, and as was described in reference to FIG. 1, the inclusion of a hydrocarbon and/or off-gas preheater for the $SO_2$-comprising flue gas stream is optional, and is not required for inclusion prior to the gases entering the reaction furnace burner. However, in accordance with one aspect of the present disclosure, it is preferred to pass one or more of these gas streams—the hydrocarbon stream, the $SO_2$-containing stream, and/or the oxygen-comprising stream-through a preheating system (such as preheater 14 or 114) prior to transferring these gas streams (separately or in combination) to a reaction furnace. This is due to the fact that heating the gas streams prior to allowing them to enter the reaction furnace reduces fuel consumption, and contributes to the economic benefits which may be realized by this invention.

Furthermore, as indicated above, the gas recycling steps associated with the hydrogenation steps of the present invention are advantageous to the presently disclosed process in that they may be performed using one or more blowers, eductors, steam jet syphons, condensers, valves, jet ejectors, or similar conveying systems in conjunction with internal-cooling hydrogenation reactor(s), inter-stage cooling reactors or the like, wherein the process stream(s) may be recycled back through the catalytic reactor as is appropriate. An exemplary circumstance wherein such a recycle process may be desirable would be during the processing of a highly concentrated or low-concentrated $SO_2$-containing stream, in order to control the temperature in the hydrogenation step in the No. 1 converter (e.g., 24 or 124), or to increase the life of the catalyst. In accordance with the processes described herein, the inclusion or elimination of such devices will not have a detrimental impact on the processes of the present disclosure.

With continued reference to the general thermal reduction process 100 illustrated in FIG. 2, a waste stream (110) comprising sulfur dioxide ($SO_2$) is combined with a gaseous oxygen-containing stream (108) and passed through a preheater (106) to generate $SO_2$-containing stream (105a). Concurrently, or alternatively in a step-wise manner, a gaseous hydrocarbon stream (102) is passed through a preheater (104) to generate heated hydrocarbon stream (105b). In accordance with the present disclosure, oxygen-containing stream (108) may be atmospheric air, oxygen-enriched air (e.g., air comprising greater than 30% oxygen), or substantially pure oxygen. Similarly, hydrocarbon stream (102) may comprise any number of hydrocarbons, such as methane ($CH_4$), ethane ($C_2H_6$), and mixtures thereof, as described previously. Heated streams (105a, 105b) are then combined in preheater (112) of furnace (114), and then combusted in furnace (114) to generate hydrogen gas ($H_2$) and carbon monoxide (CO), which in turn results in the hydrogenation of the $SO_2$ to hydrogen sulfide with the subsequent thermal conversion of $H_2S$ and residual $SO_2$ to sulfur according to the well-known Claus reaction within the furnace. From the furnace (114), the $SO_2$-containing gas stream passes through heat exchanger (116), which simultaneously cools the gas and generates high-pressure (HP) or medium-pressure (MP) steam (117), which allows for heat recovery in one or two passes through a waste heat boiler (WHB), an energy-conserving feature of this particular embodiment.

After exiting heat exchanger (116), the $SO_2$-containing gas stream may follow one or more routes. In one aspect, gas stream (118a) may pass through additional heat exchangers (120) and (122), allowing for the recovery of additional high-pressure (HP) or medium-pressure (MP) steam as indicated, as well as the recovery of low-pressure (LP) steam, after which elemental sulfur may be recovered. In accordance with aspects of the present disclosure, a slip stream of the effluent gas (118b) may be used as a hot gas bypass to heat the gases prior to entering any of the converters illustrated in FIG. 2. A reheater may also optionally be used in lieu of the hot gas bypass, although the use of a hot gas bypass is preferred in that it improves the economic benefits achieved by the processes of the present disclosure.

Returning to the process in FIG. 2, following passage through one or more heat exchangers (e.g., 120, 122), at least a portion of the gas stream (118a) may then be cooled and the resultant liquid sulfur separated to a sulfur pit (not shown), whereafter the remaining gas stream (118a) can be mixed with at least a portion of the reaction stream from hot gas bypass (118b) in order to reheat the effluent gas stream, whereafter the gas stream (118b) is then directed using appropriate conveyance means to a catalytic reactor (124) comprising one or more hydrogenation catalysts. Optionally, and equally acceptable, a portion of, or the entirety of, gas stream (118a) may be diverted (similar to the path of hot gas bypass stream 118b) from passing though additional heat exchangers (such as heat exchangers 120 and 122) once it exits the burner and furnace system (114) and associated primary heat exchanger (116). This diverted bypass gas stream (118b) may then be directed to a catalytic reactor (124) comprising one or more hydrogenation catalysts. In still further aspects of the present disclosure, the effluent gas stream exiting furnace system (114) and heat exchanger (116) may be divided into both streams (118a) and (118b), and later be recombined at some downstream point, point A, prior to entering the catalytic reactor (124).

Catalytic reactor (124) comprises at least one hydrogenation catalyst, which may be any appropriate hydrogenation catalyst suitable for the particular use, such as those employed in units that treat tail gas from Claus sulfur recovery units. Such catalysts promote the Claus reaction within the reactor, and serve the additional purposes of at least 1) shifting the CO equilibrium toward $CO_2$ and $H_2$ production, 2) consuming residual hydrogen so as to further reduce $SO_2$ to $H_2S$, and 3) hydrolyze any COS (carbonyl sulfide) and $CS_2$ (carbon disulfide) present to $H_2S$ and $CO_2$. A non-limiting, exemplary catalyst system suitable for use herein is a Co/Mo (cobalt-molybdenum) hydrogenation catalyst, which may be supported on any appropriate support know in the art, including alumina, aluminosilicates, and zeolites, prepared in any suitable manner, and as described above in association with the process of FIG. 1. Further, in accordance with the processes of the present disclosure, while the metals comprising the hydrogenation catalyst preferably comprise cobalt and molybdenum, the catalyst may also comprise components which are generally selected from the Group VI, Group VII, and Group VIII metals of the Periodic Table of the Elements, including but not limited to iron, cobalt, nickel, ruthenium, rhodium, palladium, osmium, iridium and platinum. In accordance with still further aspects of the present disclosure, the catalysts suitable for use with the processes described herein may comprise those containing one or more metals or combinations of metals of Group 4, Group 5, Group 6, Group 8, Group 9, Group 10, Group 14, Group 15 and the Rare Earth series (Group 3 elements and the lanthanides) of the Periodic Table, as described and referenced in "Advanced Inorganic Chemistry, $6^{th}$ Ed." by F. A. Cotton, et al. [Wiley-Interscience, (1999)], any of which can be present on a suitable, conventional inorganic support material. The preferred catalysts for use with the processes described herein include, but are not limited to, those containing one or more of the metals selected from the group consisting of cobalt, alumina, titanium, iron, chromium, vanadium, nickel, tungsten, germanium, zinc, cerium, and antimony, as well as combinations of two or more of these metals, such as in cobalt-molybdate catalysts. In accordance with one aspect of the present invention, the catalyst comprises titanium. In the event that the catalyst used in the processes of the present disclosure is a mixture of two metals, the ratio (on an atomic basis) of these metals is preferably between about 10:90 and about 97.5:2.5, and more particularly ranges from about 25:75 to about 95:5, including ratios between these values, such as about 20:80, about 30:70, about 40:60, about 50:50, about 60:40, about 70:30, about 80:20, about 90:10, and about 96:4, as well as ratios falling between any two of these ratios, e.g., about 95:5 and about 93:7, without limitation.

Returning to the process outlined in FIG. 2, upon exiting reactor (124), the effluent stream passes through an additional heat exchanger (126), wherein boiler feed water (BFW) passes through the heat exchanger (126) to generate additional low-pressure (LP) steam. At this stage, additional sulfur may be produced, and may be removed from the process stream using appropriate methods. The effluent stream (118c), comprising residual hydrogen sulfide and sulfur dioxide, is then contacted with one or more additional catalytic stages, comprising catalytic Claus reactors (128) and (132), wherein such catalytic reactors comprise alumina and/or titantia (Ti) catalysts, such as those known for use in association with the Claus process, and as detailed above in association with the process of FIG. 1. Following passage through catalytic reactors (128) and/or (132), the effluent stream may be passed through one or more additional heat exchanger, such as exchanger (130) and/or (134), wherein boiler feed water is passed through the exchanger and low-pressure (LP) steam (or more BFW, as in exchanger 134) is produced, while additional elemental sulfur is produced and collected. Following passage through the final catalytic stage (132) and heat exchanger system (134), the effluent stream (136), now comprising a very low amount of residual $H_2S$ and $SO_2$, can then be conveyed to the forced or natural draft thermal oxidizer/incinerator (140). The effluent stream (136) within thermal oxidizer/incinerator (140) may optionally be joined by additional oxygen-enriched air stream (137) and gaseous hydrocarbon stream (139), which may be combined in a preheater (138) prior to addition to the process effluent stream (136) within the oxidizer/incinerator (140). The thermally oxidized waste stream, upon exiting oxidizer/incinerator (140), may then be passed through a final heat exchanger (142) with the resultant generation of additional HP steam (not shown), whereafter the gas is then vented through incinerator stack (150) or the like, releasing any residual $SO_2$ in environmentally acceptable amounts.

The process as described above in reference to FIG. 2 may be considered to be generally similar to that process illustrated in FIG. 1, with the exception of the absence of the hot gas bypass and the acid gas recycle blowers. However, those of skill in the art will realize that the inclusion or elimination of such devices do not significantly impact the presently disclosed processes.

All of the compositions, methods, processes and/or apparatus disclosed and claimed herein can be made and executed without undue experimentation in light of the present disclosure. While the compositions and methods of this invention have been described in terms of preferred embodiments, it will be apparent to those of skill in the art that variations may be applied to the compositions, methods, processes and/or apparatus and in the steps or sequence of steps of the methods described herein without departing from the concept and scope of the invention. Additionally, it will be apparent that certain agents which are both chemically and functionally related may be substituted for the agents described herein while the same or similar results would be achieved. All such similar substitutes or modifications apparent to those skilled in the art are deemed to be within the scope and concept of the invention. The disclosed and undisclosed embodiments are not intended to limit or restrict the scope or applicability of the invention conceived of by the Applicant, but rather, in conformity with the patent laws, Applicants intends to protect all such modifications and improvements to the full extent that such falls within the scope or range of equivalents of the following claims.

What is claimed is:

1. A thermal reduction process for the production of sulfur from sulfur dioxide ($SO_2$)-containing effluent streams, the process comprising:
    combining a sulfur dioxide-containing effluent stream with an oxygen-containing gas stream comprising oxygen in a first preheater to elevate the temperature of the gaseous mixture to a temperature ranging from about 500° C. to about 650° C.;
    heating a hydrocarbon gas stream in a second preheater to a temperature ranging from about 500° C. to about 650° C.;
    concurrently contacting an oxygen-containing gas stream with the sulfur dioxide-containing effluent gas stream and the hydrocarbon gas stream in a single, primary reaction furnace for a period of time sufficient to produce a reducing gas effluent stream comprising hydrogen sulfide ($H_2S$) and hydrogen gas;
    contacting the reducing gas effluent stream from the reaction furnace with an activated catalyst in a first reaction zone comprising a catalyst system at a temperature effective for the reaction between hydrogen sulfide and sulfur dioxide to generate a product gas stream comprising elemental sulfur and water by way of the Claus reaction;
    further contacting the effluent gas stream from the first reaction zone with one or more additional catalytic reaction zones comprising one or more additional catalysts; and
    recovering the elemental sulfur from the product gas stream.

2. The process of claim 1 in which greater than 80% elemental sulfur recovery efficiency from the primary reaction furnace stage is achieved.

3. The process of claim 1, wherein one or more of the gaseous hydrocarbon stream, gaseous oxygen-containing stream, and the $SO_2$-containing gas stream enter the reaction furnace burner without a preheating step.

4. The process of claim 1, wherein the first converter comprises a hydrogenation catalyst.

5. The process of claim 1, wherein the first catalytic converter is a hydrogenation reactor selected from the group consisting of hydrogenation reactors, internally-cooled hydrogen reactors, interstage hydrogenation reactors, and multiple-stage hydrogenation reactors.

6. The process of claim 1, wherein the hydrogenation step comprises one or more catalytic stages.

7. The process of claim 1, further comprising recycling a portion of the product gas stream back into the reaction zone.

8. The process of claim 1, wherein the Claus conversion step comprises one or more catalytic stages.

9. The process of claim 1, wherein the catalysts comprise at least one metal selected from the Group 4, Group 5, Group 6, Group 8, Group 9, Group 10, Group 14, Group 15, and the Rare Earth Series of the Periodic Table on an inorganic support material.

10. The process of claim 9, wherein the catalyst comprises cobalt, molybdenum, titanium, aluminum, or combinations thereof, on an alumina ($Al_2O_3$) or silica ($SiO_2$) inorganic support material.

11. The process of claim 1, wherein the sulfur dioxide-containing stream comprises $SO_2$ in a molar concentration ranging from about 1 mol % to about 100 mol %.

12. The process of claim 1, wherein the sulfur dioxide-containing effluent stream comprises $SO_2$ in a molar concentration ranging from about 25 mol % to about 100 mol %.

13. The process of claim 1, wherein the hydrocarbon containing gas stream comprises one or more hydrocarbons selected from the group consisting of alkanes, alkenes, alkynes, cycloalkanes, aromatic hydrocarbons, and mixtures thereof.

14. The process of claim 1, wherein the $H_2S$-containing gas is contacted with the sulfur-dioxide containing gas stream in an amount such that the mole ratio of hydrogen sulfide to sulfur dioxide in the gaseous-mixture reaction stream ranges from about 2:1 to about 10:1.

15. The process of claim 1, wherein the recovering process comprises cooling the product gas stream in one or more sulfur condensers to condense and recover elemental sulfur from the product gas stream.

16. The process of claim 1, further comprising removing particulate material from the sulfur dioxide-containing stream prior to conveying the stream to a reaction furnace.

17. The process of claim 1, further comprising conveying at least a portion of the product gas stream through one or more additional reaction stages, the reaction stages comprising a re-heater, a sulfur reactor, a sulfur condenser, and combinations thereof.

18. The process of claim 1, wherein the gaseous mixtures are separately preheated to a temperature ranging from about 200° C. (392° F.) to about 650° C. (1200° F.).

19. The process of claim 1 in which greater than 90% sulfur recovery from the waste stream effluent can be achieved.

* * * * *